United States Patent [19]

Gryk

[11] Patent Number: 5,392,370
[45] Date of Patent: Feb. 21, 1995

[54] MULTI-CHANNEL FIBER OPTIC ROTATABLE INTERCONNECTION SYSTEM

[75] Inventor: Thomas J. Gryk, Norwich, Conn.

[73] Assignee: The United States of America as represented by the Secretary of the Navy, Washington, D.C.

[21] Appl. No.: 230,583

[22] Filed: Apr. 21, 1994

[51] Int. Cl.6 .............................................. G02B 6/26
[52] U.S. Cl. ....................................... 385/25; 385/28
[58] Field of Search .................. 385/15, 20, 21, 25, 385/26, 28, 46

[56] References Cited

U.S. PATENT DOCUMENTS 4,050,782  9/1977  Uchida et al. ........................ 385/28
4,529,986  7/1985  d'Auria et al. ...................... 385/25

Primary Examiner—Rodney B. Bovernick
Assistant Examiner—John Ngo
Attorney, Agent, or Firm—Michael J. McGowan; Prithvi C. Lall; Michael F. Oglo

[57] ABSTRACT

A multi-channel fiber optic rotatable interconnection system for coupling optical signals from a plurality of diverse optical signal sources at a source location to a like plurality of optical signal receivers at a destination location rotatable relative to each other. The interconnection system comprises an input fiber and an output fibber both of which are comprised of step-index multimode optical fibers. The input fiber includes an input end which receives optical signals from the optical signal sources, the fiber forming a composite optical signal therefrom. The optical signal sources are positioned at diverse polar angles relative to the input end of the input fiber to provide a plurality of optical transmission modes having minimal crosstalk, so that the composite optical signal can be resolved into its component optical signals at the destination. A rotatable coupler is positioned co-axially between the input fiber and the output fiber thereby no allow the input fiber and the output fiber to rotate axially relative to each other. The rotatable coupler couples the composite optical signal from the input fiber to the output fiber. A signal detection arrangement positioned axially at the output end of the output fiber receives optical signals therefrom and separates it into its component optical signals for coupling to the receivers.

9 Claims, 2 Drawing Sheets

MULTI-CHANNEL FIBER OPTIC ROTATABLE INTERCONNECTION SYSTEM

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

(1) Field of the Invention

The invention relates generally to the field of fiber optic data transmission systems and more particularly provides an arrangement for use in concurrently transmitting a plurality optical signals from a like plurality of inputs over a single optical fiber, and for separating the individual optical signals at the output.

(2) Description of the Prior Art

Fiber optic data transmission systems have been developed and are finding use in areas in which high data transfer rates are required, since optical fibers can easily transfer signals of very high bandwidth. In addition, fiber optic transmission systems are finding use in areas in which environmental damage can occur to conventional copper wire transmission systems. There are, however, several problems with use of optical fibers as data transmission media, which do not arise in connection with copper wire transmission system. One problem arises in connection with joining of two optical fibers, which must be accomplished if a single length of optical fiber does not sufficiently long to extend between the signal source and the intended destination. Joining of two copper wires in a conventional copper wire transmission system is generally a relatively simple matter. Another problem arises in connection with coupling of signals from a number of sources at a common location for transfer over a single optical fiber to a destination, and then separating the signals at the destination. With conventional copper wire transmission systems, it is well known that signals of diverse frequencies can easily be transferred over the same copper wire and resolved into the individual signals at the output.

A further problem arises if the source location and the destination need to rotate relative to each other, which may occur if the source is, for example, an optical signal generator located in a periscope and the destination is processing circuitry elsewhere in a submarine. It is known that optical fibers are generally quite brittle, and with twisting and bending they can easily be broken.

A prior art structure for coupling signals where the source location and the destination need to rotate relative to each other employs an intermediate de-rotation prism which must be rotated at one-half the rate of relative rotation of the source and destination. Such an arrangement clearly requires a complex mechanical linkage.

SUMMARY OF THE INVENTION

It is an object of the invention to provide a new and improved fiber optic rotatable interconnection system for facilitating the transfer to a destination location of input optical signals from multiple sources concurrently over a single optical fiber, where the sources and destination may rotate relative to each other, and to separate the individual optical signals at the destination.

It is a further object to provide an fiber optic rotatable interconnection system that provides for a plurality of optical channels which may be used to concurrently couple optical signals from the source at the system's input to the destination.

In brief summary, the multi-channel fiber optic rotatable interconnection system couples optical signals from a plurality of diverse optical signal sources at a source location to a like plurality of optical signal receivers at a destination location rotatable relative to each other. The interconnection system comprises an input optical fiber and an output optical fiber, both of which comprise step-index, multi-mode optical fibers. The input fiber includes an input end which receives optical signals from the optical signal sources, the fiber forming a composite optical signal therefrom. The optical signal sources are positioned at diverse polar angles relative to the input end of the input fiber to provide a plurality of optical transmission modes having minimal crosstalk, so that the composite optical signal can be resolved into its component optical signals at the destination. A coupler, which is rotatable relative to one or both input and output fibers, is positioned co-axially between the input fiber and the output fiber thereby to allow the input fiber and the output fiber to rotate axially relative to each other. The rotatable coupler couples the composite optical signal from the input fiber to the output fiber. A signal detection arrangement positioned axially at the output end of the output fiber receives optical signals therefrom and separates it into its component optical signals for coupling to the receivers.

Although the rotatable coupler must be rotatable relative to at least one of the input and output fibers, unlike the prior art employing de-rotation prisms there is no requirement of a specific relationship between rotation of the coupler and the relative rotation of the input and output sections. This eliminates the need for a complex linkage such as is required in the prior art.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
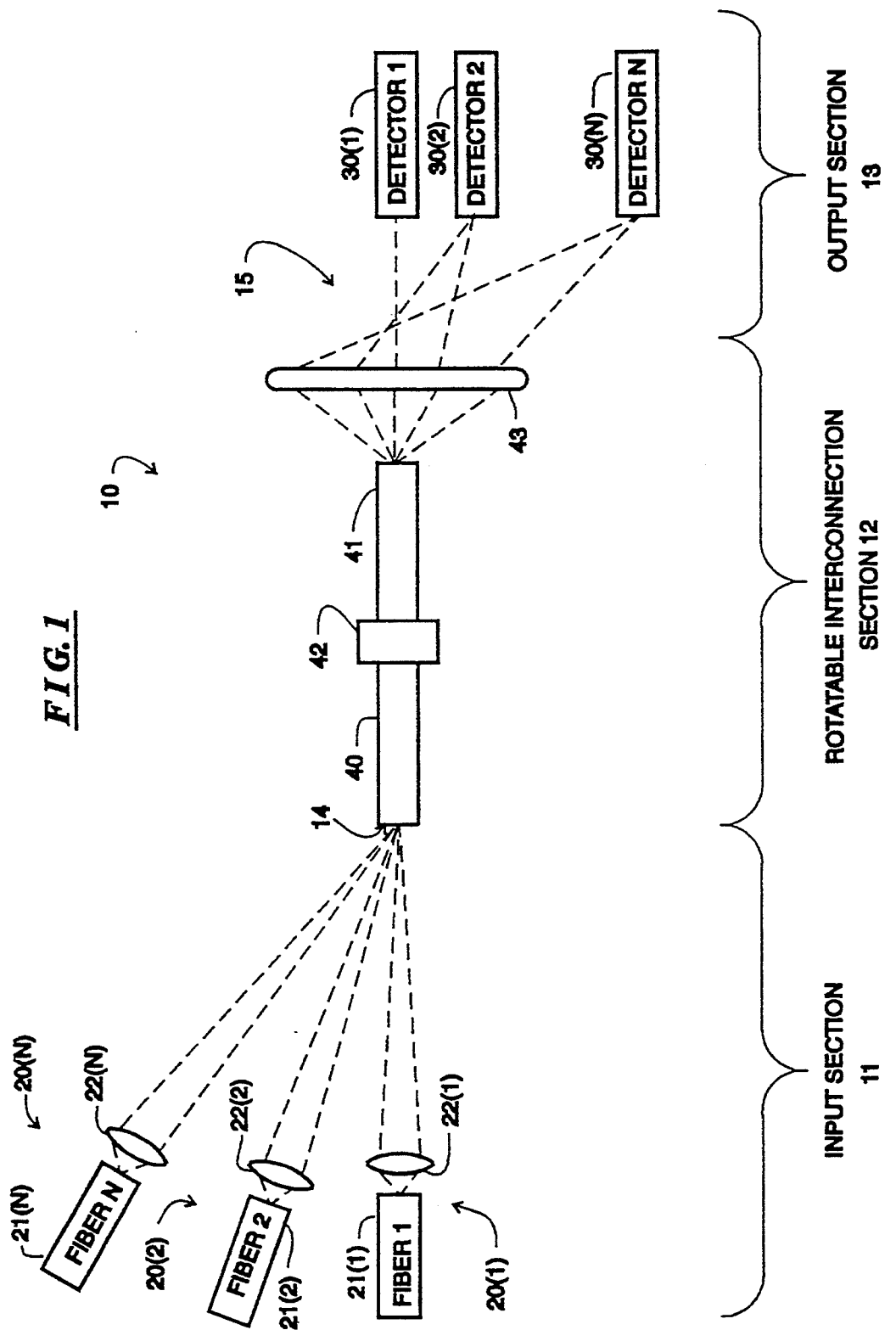
FIG. 1 is a schematic diagram of a multi-channel fiber optic rotary interconnection system constructed in accordance with the invention.

FIG. 1 is a schematic diagram of a multi-channel fiber optic rotary interconnection system 10 constructed in accordance with the invention. With reference to FIG. 1, system 10 includes an input section 11, an interconnection section 12 and an output section 13. Interconnection section 12 is rotatable (1) relative to one but not the other of the input and output sections 11 and 13, or (2) relative to both sections 11 and 13. It shall hereinafter in this specification and claims be described as a "rotatable interconnector" or "rotatable coupler," and the terms are to be construed as "rotatable" inclusive of both situations (1) and (2). The input section 11 couples optical signals from a plurality of sources generally identified by reference numeral 20(i) ("i" is an index from 1 to N) to an input end 14 of the rotatable interconnection section 12. Each source 20(i) may, for example, comprise a conventional transducer for converting an electrical signal generated by an electrical circuit element (not shown) into an optical signal. The rotatable interconnection section 12 transfers the multiple optical signals from the input end 14 to an output end 15. The output end 15 resolves the multiple optical signals into the individual signals and couples them to individual detectors generally identified by reference numeral 30(j) ("j" is an index from 1 to N) in the output section 11. The rotatable interconnection section 12 permits efficient transfer of the optical signals between the input and output sections 11 and 12 while the sections 11 and 12 are stationary or while they are rotate relative to each other.

The input section 11 includes a number of optical signal sources 20(i), which may comprise, for example, optical fibers 21(i), or another appropriate source of optical signals, and a focusing lens 22(i). Each optical fiber 21(i) is preferably of conventional single-mode optical fiber construction which may transfer an optical signal from any conventional optical signal generator (not shown) to the interconnection system 10. Single-mode optical fibers are generally well known in the art, and will not be described in detail herein; reference may be made, for example, to T. Li, "Structures, Parameters and Transmission Properties Of Optical Fibers", Proceedings of the IEEE, Vol 68, No. 10 (October 1980), pages 1175–1180, for a description of the structure and optical properties of single-mode optical fibers. The optical signal projecting from the end of each optical fiber 21(i) (illustrated in FIG. 1 by means of dashed lines) is received by the focusing lens 22(i) of each optical signal source 20(i), and the focusing lens focuses the optical signal onto the input end 14 of the rotatable interconnection section 12, in particular onto a point corresponding to an optical fiber thereof as will be explained below, effectively providing a composite multi-mode optical signal which the rotatable interconnection section 12 can couple to a destination at which the output section 13 is located. (Light forming the optical signals in FIG. 1 is generally in conical form, whose boundaries are represented by the dashed line shown in the FIG.) The optical signal sources 20(i) are positioned at diverse polar angles relative to the axis of the input end 14 of the rotatable interconnection section, the purpose for which will be described below.

The rotatable interconnection section 12 includes an input fiber 40, one end of which corresponds to the input end 14 and an output fiber 41 connected by a rotatable interconnector 42 (described in more detail below in connection with FIG. 2), and a signal detection arrangement 43 (described below in more detail in connection with FIG. 3). The input and output fibers 40 and 41 are of conventional multimode step-index optical fiber construction. Multi-mode optical fibers are generally well known in the art, and will not be described in detail herein; reference may be made, for example, to the above-identified Li article for the structure and optical properties of multi-mode fibers. The maximum polar angle for a signal source 20(N) will be less than or equal to the inverse sine of the "numerical aperture" of the input fiber 40. The rotatable interconnector 42 enables the two fibers 40 and 41 to rotate relative to each other. The orientation of the sources 20(i) in the input section 11 are preferably stationary relative to the input fiber 40, and since the rotatable interconnector 42 permits rotation of the input fiber 40 relative to the output fiber 41, the rotatable interconnector 42 effectively permits the sources 20(i) to rotate relative to the output section 13. The signal detection arrangement 43 receives the composite multi-mode optical signal from the output fiber 41 and resolves the composite signal into the separate optical signals, and couples each optical signal to a detector 30(i). The detectors 30(i) may comprise transducers for converting the optical signals to electrical form, or additional optical fibers for transferring the optical signals to a final destination, such as a transducer, for use. If a detector 30(i) is an optical fiber, it may comprise a single mode optical fiber. Alternatively, any of the detectors 30(i) may comprise other apparatus such as optical computers or optical signal processing devices for using the optical signal received thereby in optical form.

As noted above, the optical signal sources 20(i) are positioned at diverse polar angles relative to the axis of the input end 14 of the rotatable interconnection section 12. Since the input fiber 40 of the rotatable interconnection section 12 is a step-index multi-mode fiber, the principal mode number of the optical signal that it receives is solely a function of the angle of incidence, relative to the axis of the fiber. Since optical signals with different principal mode numbers will only be weakly coupled in a step-index multi-mode fiber, the use of step-index multi-mode fibers in fibers 40 and 41 of the rotatable interconnection section 12 enables the section 12 to transmit the composite optical signal to the signal detection arrangement 43. The arrangement 43 resolves the composite optical signal into its separate components, that is, into the separate optical signals as provided by the individual sources 20(i). The strong coupling of azimuthal modes of the same principal mode number provides a symmetrical distribution of power of the optical signal at the rotary interface from the asymmetric input of the optical signal from the signal sources 20(i) at the input end 40 of the input fiber. Accordingly, the rotatable interconnection section 12 effectively provides an arrangement for providing a plurality of diverse channels in the composite optical signal, each channel for carrying one of the separate optical signals provided by the sources 20(i).

Figure 2:
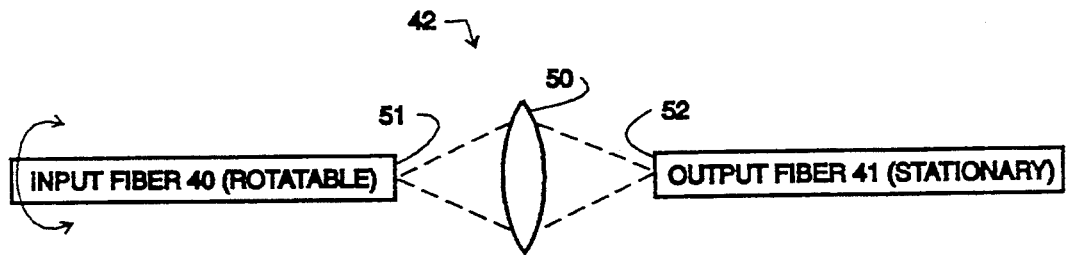
FIG. 2 is a detailed schematic diagram of a rotatable interconnector useful in the multi-channel fiber optic rotary interconnection system depicted in FIG. 1.

FIG. 2 is a detailed schematic diagram of rotatable interconnector 42 useful in the embodiment multi-channel fiber optic rotary interconnection system 10 depicted in FIG. 1, although it will be appreciated that any conventional rotary joint element (such as a prism) could be used for the rotatable interconnector 42. With reference to FIG. 2, the rotatable interconnector 42 includes a coupling lens 50 positioned to receive the composite optical signal from a proximate end 51 of input fiber 40 and focus the light forming the composite optical signal so received onto the exposed core of the proximate end 52 of fiber 41. (As in FIG. 1, light forming the composite optical signal in FIG. 2 is generally in conical form, whose boundaries are represented by the dashed line shown in FIG. 2) The coupling lens 50 in one embodiment comprises a conventional SELFOC lens. While small lateral misalignments in the axes of the two fibers 40 and 41 and the coupling lens 50 do not adversely affect the coupling performance if the rotatable interconnector 42 (except that it may lead to some attenuation of the composite optical signal), the angular misalignments are preferably minimized since they may induce undesirable couplings between modes, which can increase cross-talk as among the optical signals in the various channels which form the composite optical signal transmitted by the rotatable interconnector 42 from the input fiber 40 and the output fiber 41.

As noted above, the output fiber 41 couples the composite optical signal from the rotatable interconnector 42 to the signal detection arrangement 43, which resolves the composite optical signal into its component individual optical signals. FIG. 3 is a detailed schematic diagram of a signal detection arrangement 43 useful in the multi-channel fiber optic rotary interconnection system 10 depicted in FIG. 1. With reference to FIG. 3, the signal detection arrangement 43 includes a lens 60 positioned co-axially with the output fiber 41 to receive the composite optical signal projecting from the output end 61 of the output fiber 40, and an optical signal channel separator arrangement 62. The lens 60 is either a generally divergent lens or has a generally long focal length, so that light that enters the lens 60 from the output fiber at different annular distances from the lens' axis will exit the lens 60 generally parallel to the axis. Light generally along the surfaces of cones with vertices of different angles projecting from the output end 61 of output fiber 40 will comprise the optical signals from different sources 20(i).

Figure 3:
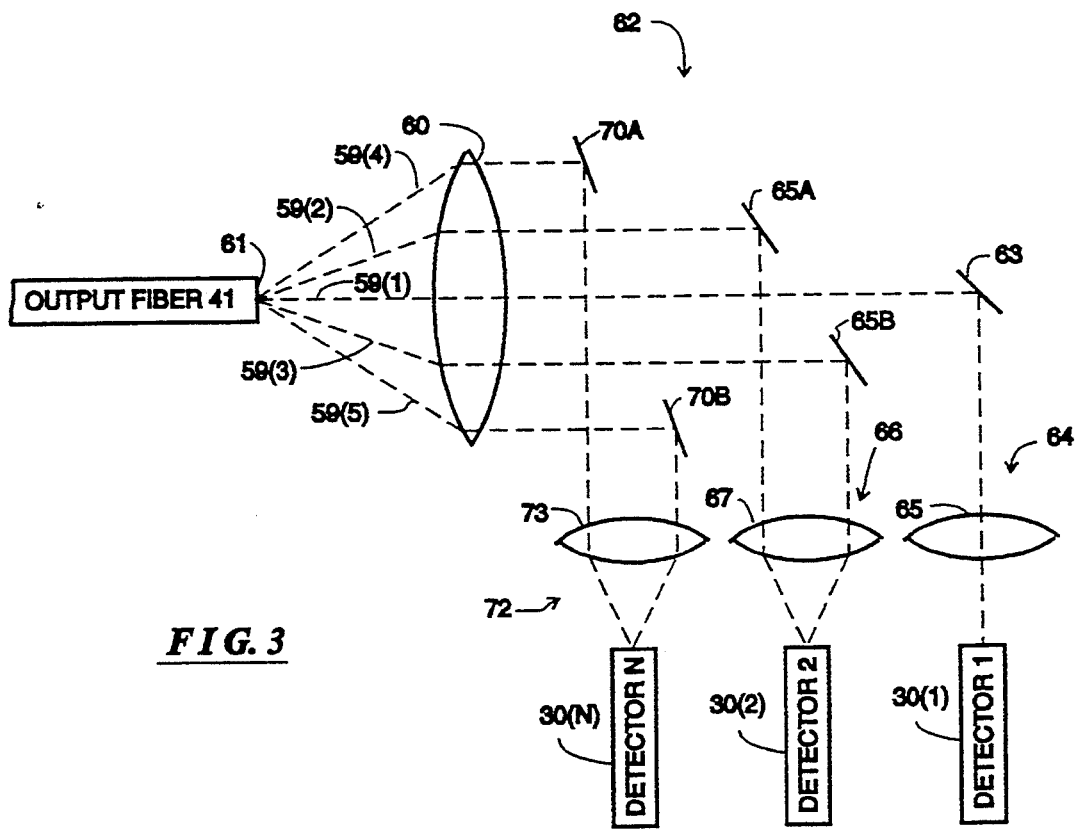
FIG. 3 is a detailed schematic diagram of a signal detection arrangement useful in the multi-channel fiber optic rotary interconnection system depicted in FIG. 1.

That is, as represented indicated in FIG. 3, light exiting the output fiber 41 nearest the lens' axis (representing a cone having a vertex with a relatively small angle) will comprise the optical signal from the source 20(1) nearest the axis of the input fiber 40. (As in FIGS. 1 and 2, light is generally represented by a dashed line.) Thus, light represented by the dashed line 59(1), which may be considered representing a cone whose vertex, located at the end 61 of output fiber 40, has a relatively small angle, represents the optical signal provided by the source 20(1), which is located on the axis of the input fiber 40. On the other hand, light exiting the output fiber in cones with vertices having progressively larger angles will comprise the optical signals from sources 20(i) having progressively larger angles of incidence relative to the axis of the input fiber 40. Thus, light represented by the dashed lines 59(2) and 59(3) represents a cone of light comprising the optical signal from source 20(2) having a selected angle to the axis of the input fiber 40, and light represented by the dashed lines 59(4) and 59(5) represents a cone of light comprising the optical signal from source 20(N) having a selected greater angle to the axis of the input fiber 40. For both the cone represented by lines 59(2) and 59(3), and the cone represented by lines 59(4) and 59(5), the light representing the respective optical signal generally forms the surface of the respective cone, and does not travel along the interior of the cone, which enables the lens 60 and the optical signal channel separator arrangement 62 to resolve the composite optical signal into its separate component optical signals. Accordingly, the light incident upon the lens 60 from the output end 61 of output fiber 41 is essentially in the form of concentric rings, along with a circle on the axis if there is a such as source 20(1) projecting the optical signal toward the input end of the input fiber 40, with each successive ring comprising the optical signal from sources 20(i) of successive angles from the axis of the input fiber.

The lens 60 essentially preserves the concentric relationship among the optical signals as it couples them to the optical signal channel separator arrangement 62. In one embodiment, the lens 60 transmits the optical signals to the optical signal channel separator arrangement 62 in separate generally cylindrical form, with the optical signals of cylinders of successively larger diameter being related to the successive channels from the composite optical signal. The optical signal channel separator arrangement 62 is provided to separately intercept the light comprising each cylinder and provide it as an optical signal to a signal sink, such as a detector 30(i).

The optical signal channel separator arrangement 62 includes a mirror arrangement including a plurality of generally annular mirrors to intercept light forming the different cylinders for the diverse optical signals. Accordingly, a single mirror 63 is positioned along the axis of the lens 60 to intercept the light along the axis, which comprises the light optical signal provided by the source 20(1) along the axis of the input fiber 40, and reflect the light to a detection arrangement 64 which may comprise a focusing lens 65 and, for example, the detector 30(1) described above in connection with FIG. 1. An annular mirror represented by mirror sections 65A and 65B having a reflective surface situated at a selected uniform radial distance from the axis of lens 60 corresponding to the radius of the intermediate cylinder will receive light from an optical signal originating from another source, such as source 20(2), and reflect the light to a detection arrangement 67, which, like detection arrangement 64, may comprise a focusing lens 67 and the detector 30(2). Similarly, an annular mirror represented by mirror sections 70A and 70B having a reflective surface at a larger selected uniform radial distance from the axis of lens 60, will receive light comprising the optical signal from the source 20(N), and reflect the light to a detection arrangement 72, which may also comprise a focusing lens 73 and the detector 30(N). It will be appreciated that the particular radial distances from the axis of lens 60 at which the annular mirror for each channel will be located will depend upon the optical characteristics of the lens 60 in relation to the cones of light and the particular angles of the respective optical signal sources 20(i) relative to the axis of the input fiber 40. (It will further be appreciated that FIG. 3 is a schematic representation of the optical signal channel separator arrangement 62 used in one embodiment of the system 10 and not necessarily drawn to any particular scale, and that the locations of the annular mirrors along the axis of the lens 60, their radial distances from the axis, and the angles of incidence and reflection of the light impinging thereon and reflecting therefrom may differ substantially from the representation shown in FIG. 3.)

The multi-channel fiber optic rotary interconnection system 10 is susceptible to a number of modifications. For example, while the system 10 has been described as effectively transferring optical signals from sources located proximate one end of the rotatable interconnection section 12, identified in FIG. 1 as the input end 14, to a destination located proximate the output end 15, it will be appreciated that conventional power splitters or wavelength-division multiplexers (not shown may be positioned proximate the ends 14 and 15 to permit the system 10 to facilitate bi-directional transfer of optical signals between the ends 14 and 15 through the rotatable interconnection section 12.

In addition, the sources 20(i) may each comprise multi-mode fibers, instead of single-mode fibers. In that case, the core diameter of the fiber comprising each source 20(i) should be less than the core diameter of the input fiber 40, or alternatively the diameter of the fiber comprising each source 20(i) should have a numerical aperture less than that of the fiber 40, to insure low insertion loss of the optical signal into the rotatable interconnection section 12.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A multi-channel fiber optic rotatable interconnection system for coupling optical signals from a plurality of diverse optical signal sources at a source location to a like plurality of optical signal receivers at a destination location, the source location and the destination location being rotatable relative to each other, the interconnection system comprising:
   an input fiber and an output fiber both comprising step-index multi-mode optical fibers, the input fiber having an input end for receiving optical signals from said optical signal sources and forming a composite optical signal therefrom, the optical signal sources being positioned at diverse polar angles relative to the input end to provide a plurality of optical transmission modes, the output fiber having an output end;
   a rotatable coupler positioned co-axially between the input fiber and the output fiber thereby to allow the input fiber and the output fiber to rotate axially relative to each other, the rotatable coupler coupling the composite optical signal from the input fiber to the output fiber; and
   a signal detection arrangement positioned axially at an output end of said output fiber to receive optical signals therefrom and to separate the composite optical signal into its component optical signals for coupling to the receivers.

2. A multi-channel fiber optic rotatable interconnection system as defined in claim 1 in which said rotatable coupler comprises a lens positioned coaxially with an output end of said input fiber and an input end of said output fiber, the lens receiving the composite optical signal transmitted from the output end of said input fiber and focusing it on the output fiber's core at its input end.

3. A multi-channel fiber optic rotatable interconnection system as defined in claim 1 in which said signal detection arrangement comprises:
   composite optical signal separation means for separating the composite optical signal into light comprising the individual optical signals as provided by the sources; and
   optical signal accumulator means for accumulating the light comprising each individual optical signal as separated by the composite optical signal separation means into a
   individual optical signals for transmission to said detectors.

4. A multi-channel fiber optic rotatable interconnection system as defined in claim 3 in which said channel separation means comprises a lens positioned co-axially with the output fiber output end, the lens receiving light comprising the composite optical signal and transmitting light in the form of rings of diverse diameters, the light of each ring comprising the optical signal as provided by one of said sources, with the light of rings of increasing diameters being from sources of increasing polar angles relative to the input fiber input end.

5. A multi-channel fiber optic rotatable interconnection system as defined in claim 4 in which said channel accumulator means comprises a plurality of annular mirrors of diverse diameters each positioned to receive the light of a selected ring and to reflect the received light to a receiver as one of said optical signals.

6. A multi-channel fiber optic rotatable interconnection system as defined in claim 1 in which each the input fiber includes a core, and said optical signal source includes a single mode optical fiber having a transmission end for transmitting an input optical signal and focusing means for focusing the optical signal transmitted from the transmission end onto the input fiber core.

7. A multi-channel fiber optic rotatable interconnection system as defined in claim 6 in which said focusing means comprises a lens.

8. A multi-channel fiber optic rotatable interconnection system as defined in claim 1 in which said receiver comprises a detector including a transducer for converting the optical signal it receives from the signal detection arrangement into an electrical signal.

9. A multi-channel fiber optic rotatable interconnection system as defined in claim 1 further comprising optical multiplexer means positioned proximate the input fiber input end and the output fiber output end for enabling bidirectional optical signal transmission between said input fiber input end and said output fiber output end.

* * * * *